Jan. 31, 1933.   G. P. REGAN ET AL   1,895,644
METHOD OF PRODUCING SOUND PICTURES
Filed May 26, 1930

INVENTORS.
George P. Regan,
Albert R. Day.
BY Townsend, Loftus & Abbett
ATTORNEYS.

Patented Jan. 31, 1933

1,895,644

UNITED STATES PATENT OFFICE

GEORGE P. REGAN AND ALBERT R. DAY, OF OAKLAND, CALIFORNIA

METHOD OF PRODUCING SOUND PICTURES

Application filed May 26, 1930. Serial No. 455,735.

This invention relates to a method of producing sound pictures and especially to a method whereby a sound picture produced in one language may be reproduced in any and all languages.

Since the introduction of the sound producing film into the motion picture industry complications have arisen, particularly, the inability of the players to speak different languages. A picture produced in English speaking countries by players speaking the English language will not be accepted in a foreign country, and likewise, pictures produced in foreign countries with foreign players speaking their mother tongue would not be acceptable in America or other English speaking countries.

The United States, which heretofore practically controlled the motion picture output of the world, finds itself in a position where it cannot supply foreign markets with acceptable talking pictures.

The silent drama being replaced by the spoken drama must be produced in all tongues. Production of sound producing pictures are already at a high point and to drill and take each picture with a complete foreign cast of players would mean the encountering of endless difficulties and prohibitive costs.

The object of the present invention is to provide a method and apparatus whereby sound pictures or spoken words or song in one language may be translated to any other language; and particularly to provide a method whereby actors capable of singing and speaking in the English language will appear as capable of speaking or singing in any language.

The method employed is described in the accompanying specification and one form of apparatus which may be employed is shown by way of illustration in the accompanying drawing, in which—

Figure 1:
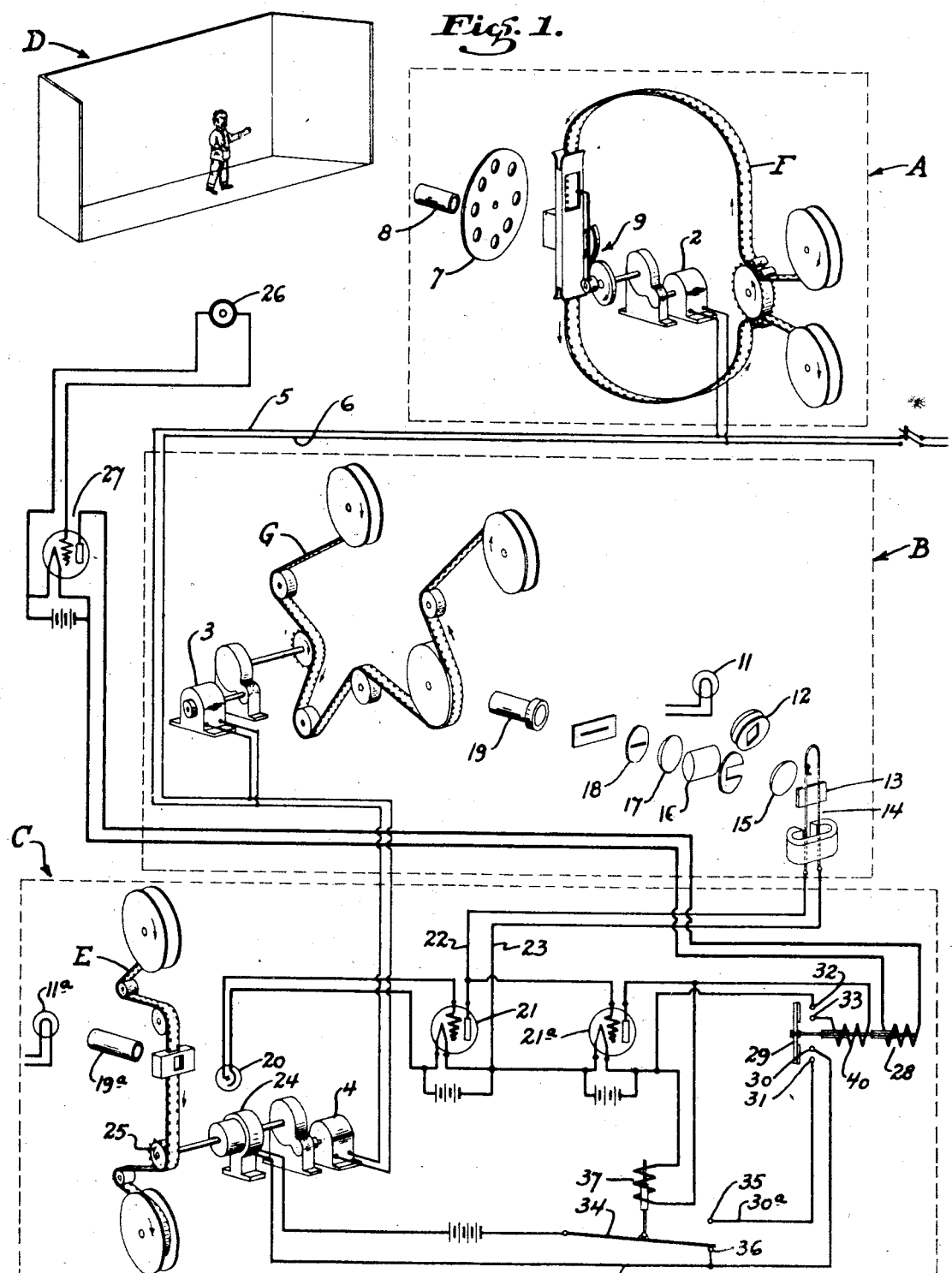
Fig. 1 is a diagrammatic view of the apparatus.

In describing the method, let it be assumed that a play termed John Doe and wife is to be produced in sound and pictures for the English speaking public. The play is a comedy. It contains two actors, to-wit, John Doe and his wife. They act, speak and sing in English and sound and picture cameras record the play in the usual manner.

The scenario assumed to be suitable and acceptable in foreign countries, it is decided to produce the play with the same actors and set in different languages, for instance, French, German, Italian, Spanish, etc. The English speaking actors employed speak none of the languages specified and under present conditions it would accordingly appear impossible to use these actors for the production of the foreign films.

The purpose of the present invention is to make it possible to employ these actors. The method of procedure is as follows:

The play in written form is handed to a director skilled in the art and particularly in the desired foreign language. He or she translates the spoken words, songs, etc., for instance into Spanish, and he also translates the spoken words, songs, etc., into a code form, the words simulating in lip movement the spoken Spanish words. The Spanish translation is handed to selected readers, who are fluent in Spanish and who are possessed of the desired ability and voice quality. Their reading and singing is recorded on a sound film by standard methods and the sound film produced will later be employed and will be referred to as the neutral film. The code translation of the play is arranged to be used by the English actors while the play is being photographed so that the picture produced will show the actors' lips moving in simulation to the Spanish words recorded on the neutral film. The code or codified words used in this translation may be any series of words with or without any meaning or any significance so long as they simulate the lip movement of the foreign language or words, songs, etc., as recorded on the neutral film.

When the neutral film has been completed and the English speaking actors have memorized the codified sentences which they are to speak or sing during the taking of the Spanish play, three cameras, such as indicated at A, B and C are arranged, for instance, in front of the stage indicated at D. The camera indicated at A is a standard form of photographic or picture recording camera; the camera indicated at B is a sound recording camera; and the camera indicated at C is a transfer camera in which is placed the neutral film indicated at E. Each camera is driven by a synchronous motor, the motors being indicated at 2, 3 and 4, respectively. All the motors are connected with a common source of alternating electric current supply through wires 5 and 6, hence insuring synchronous action between the cameras when they are in operation.

The negative film employed in the photographic or picture recording camera is indicated at F. It is intermittently driven or moved with relation to the shutter 7 and the lens 8 by an intermittent motion mechanism generally indicated at 9, of standard form, driven by motor 2 and as the actors are acting, speaking and singing pictures will be taken on the film F.

The sound recording camera indicated at B contains a film indicated at G, this film being driven in unison with the photographic film F in the usual manner at a constant rate of speed, for instance, ninety feet per minute. This film does not record the codified sentences or words spoken by the actors on the stage but it records the Spanish words and songs previously recorded on the neutral film E, and this is accomplished as follows:

Light is generated by a concentrated filament gas film lamp 11 which is focused by a double convex condensing lens 12 onto a mirror 13 of a vibrator 14. The other lens shown at 15 is a plain lens which acts as a window in the galvanometer housing which encloses the mirror 13 and the mechanism actuating the same. The window 15 is placed at an angle so that the light will not be reflected from its surface onto the rest of the system. The light is reflected from the mirror through a cylindrical lens 16. This lens condenses the beam of light in one direction only and then passes through another condenser 17 onto a disc 18. This disc has a cut or fine slit formed in it approximately .003 inches wide through which the light passes into a microscope objective 19. This objective focuses the image of the slit on the film reducing it at the same time by a four to one ratio. This results in a light image on the film approximately .00075 inches wide and .070 inches long.

Under normal operating conditions, only one-half the sound track of film G is exposed. The light which would normally expose the other half of the track is intercepted by a screen. This screen has graduations marked on it denoting the limits through which the light beam may move without over-modulating the film or, in other words, without over-shooting the sound track. As alternating current is fed to the vibrator 14, it causes the loop of the vibrator to twist back and forth. This rocks the mirror and increases or decreases the length of the slit image on the film. The width of the slit image being at all times constant, the result is a sound track of varying width which has the appearance of a serrated edged exposure. The shape of these saw teeth, of course, depends upon the width of the original sound wave and will under ordinary conditions be an exact reproduction of the sound wave on the neutral film indicated at E.

Vibrator 14 is actuated by a photoelectric cell 20 mounted in the transfer camera C. This camera is also provided with a lamp such as shown at 11a similar to the lamp shown in camera B. The light from the lamp 11a is focused on the neutral film through a lens 19a an if the film is moving the light projected on the photoelectric cell 20 will vary and the current flow produced thereby will proportionately vary. This current is amplified by the amplifier indicated at 21 and the amplified current passes through wires 22 and 23 to actuate the vibrator 14, hence causing the mirror 13 to vibrate and reproduce the exact sound waves on film G which have previously been produced or recorded on the neutral film E.

Camera C contains a magnetic clutch 24 which forms a driving connection between the sprocket 25 whereby film E is driven and the synchronous motor 4. When the magnetic clutch is energized sprocket 25 and film E are driven and when the magnetic clutch is de-energized no movement will be transmitted to the neutral film E. The magnetic clutch 24 is primarily actuated by a condenser type of microphone shown at 26, this microphone is placed adjacent the stage where it will receive the sound vibrations of the English actor, who as previously stated speaks in codified language. The modulated current set up by the microphone is amplified by an amplifier 27 and the amplified current passes through a relay coil 28 and energizes the same. Relay 28 in turn actuates a switch 29 and this is adapted to close two circuits, first a circuit through contacts 30 and 31, and secondly, a circuit through contacts 32 and 33. The circuit through contacts 31 and 30 is closed through the magnetic clutch 24 through wires 30a and 31a and also by means of a relay switch 34 which operates between a pair of contacts 35 and 36. Relay switch 34 being actuated by a relay coil 37 which in turn is actuated by the amplifier 21 and a second amplifier indicated at 21a. This second amplifier also operating to supply sufficient current to close a circuit through contacts 32 and 33 and a holding coil indicated at 40.

Figure 2:
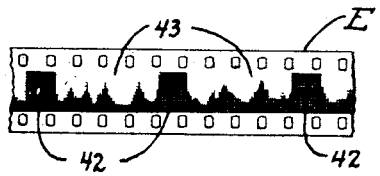
Fig. 2 is a fragmentary view of a variable arc sound film.

Before describing the actual operation, it should be understood that the sound films employed at E and G may be of the variable area or variable density type. For purposes of illustration a sound film of the variable area type is shown in Fig. 2. The heavy dark spaces on this film indicated at 42 are the spaces between words while the clear areas indicated at 43 between the heavy dark spaces represent the vibrations of each word. This is the type of film indicated at E and in actual operation it will be assumed that a clear area or word on the film is in alignment with the lens 19a, if this is the case light will pass through the film and the photoelectric cell will accordingly be energized. The current of this cell is amplified by the amplifiers 21 and 21a hence passing current through the loop of the vibrator 14 and also current through relay coil 37 so as to energize the same and cause the switch 34 to engage contact 35. The closing of the contact 35 prepares a circuit through the magnetic clutch 24 which is closed when relay coil 28 is energized. Film E is standing still but if the actor on the stage speaks the sound vibration sets up a current in the microphone 26 which is amplified and thereby causes energization of relay coil 28, this closes switch 29 and the circuit through the contacts 30 and 31, hence current will flow through wires 30a and 31a, contact 35, switch 34, magnetic clutch 24 and back through wire 31a to contact 31. The moment clutch 24 engages, film E starts moving and as a word such as shown at 43 is passing in front of the lens 19a a modulating effect is set up in the photoelectric cell 20 and is reproduced in the vibrator 14 of the camera B. Mirror 13 is accordingly vibrated in synchronism with the vibrations 43 on film E and the same vibrations are accordingly recorded on film G. Coil 28 remains energized only as long as sound vibrations are striking the microphone 26. The moment these sound vibrations cease relay coil 28 is deenergized, but the holding coil 40 is energized as contacts 32 and 33 are closed by switch 29, hence the circuit through the magnetic clutch remains closed even though the sound vibrations have ceased and film E will continue to travel so as to complete recording of the word. The holding coil only remains energized as long as light is passing through film E but the moment a dark space appears no light passes through, hence the photoelectric cell is deenergized and so is the holding coil and when the holding coil is deenergized so will be the relay coil indicated at 37, switch 34 will thereby drop and close a circuit through the contact 36, clutch 24 will engage due to the closing of a second circuit therethrough and the film will move the distance of the dark space 42. The moment the film has been moved this distance light again passes through the film and is projected on the photoelectric cell 20, coil 37 is accordingly energized and the last circuit through contact 36 and the magnetic clutch is broken and the film comes to a stop at the beginning of the next word.

If a sound wave again strikes the microphone 26 relay coil 28 is again energized thereby closing switch 29 and the circuit through the magnetic clutch 24. The film is moved the distance of another word and the modulating current produced actuates the vibrator 14 and records that word on the film G. When the film E is moved the distance of the next word the next dark mark or spacing appears causing deenergization of coils 37 and 40 which breaks the magnetic clutch circuit which is again closed when contact 36 is engaged, hence the film again makes another move past the dark space on the film and when the light appears the circuit will be broken and the film will not move until another sound vibration impinges the microphone 26.

It will of course be understood that the codified words spoken by the actor are in sound and lip movement very similar to the Spanish spoken words recorded on film E. The lip movement is exceedingly essential as it is recorded on the film F. The length of the codified word and the Spanish should be closely approximated and the speed at which they are spoken should be approximately the same so that as each spoken codified word enters the microphone it acts on the relay coils indicated at 28, 37 and 40 to synchronize the words on the neutral film with the codified words spoken by the actor. When the English speaking actor or actors have completed the play neutral film E will have been run through, the record thereof has been transmitted to the film G and the picture of the acting and of the mouth movements of the actors is recorded on the film F. Films F and G may then be removed and developed in the usual manner and they may then be printed to produce a positive film having both the picture and the tone track reproduced thereon. This film is then ready for export to the foreign country intended and when the film is displayed it will appear that the English speaking actors are speaking fluent Spanish as the lip movement of the spoken words will conform to the spoken words on the neutral film and as these spoken words were spoken by a reader fluent in the foreign language the English actor will appear to speak with the complete fluency and accent of a native of that country.

While the method described is particularly intended for translating sound pictures from one language to another it may also be used where English speaking actors have a poor voice. It is well known that some voices do not reproduce satisfactorily on the sound film or disc record and in that case the spoken words could be spoken by a reader or substitute for the actual actor and recorded on the neutral film. The actual actor would in that instance speak the same words but in speaking them the words would merely impinge on the microphone and thereby control the movement of the neutral film which is recorded on the sound film, hence in place of recording the words of the actor the words on the neutral film will be reproduced on the film picture.

While we have referred to the three instruments A, B and C as "cameras", as those instruments are usually designated, in the claims we refer to the instrument A as a "motion picture camera", the instrument B as a "sound recording apparatus" or machine, and the instrument C as a "sound projection apparatus" or machine; the film that is carried by the apparatus C being designated a "neutral" film.

By the term "code" or "code text" used herein, we mean any set of words, syllables, or sounds corresponding in sequence and successive phonetic values to the words, sounds or phonetics correspondingly appearing on the neutral film.

Having thus described our invention, what we claim and desire to secure by Letters Patent is—

1. A method of translating sound films from one language to another which consists in translating the words, songs, etc., of one language into another language, recording on a sound film the translated words as spoken or sung by one person, making a second translation of the words, songs, etc., in code words simulating the lip-movement of the successive translated words, photographing on the picture film the lip-movement and acting of an actor while speaking or singing the coded language, and transferring the pictures on said picture film and the sound record on the sound film to a common film.

2. A method of producing a spoken sound film in a different language from that spoken by the actor appearing on said film, which includes the following steps: first, producing a neutral film by recording on a sound film the desired foreign text in the foreign language; second, producing a code translation simulating the successive lip-movements of the foreign text; third, photographing on a motion picture film the actor in action and in whose mouth the foreign words are to appear and at the same time the said actor speaking the code text; fourth, producing on a third film simultaneously with recording of the actions of the actor a reproduction of the foreign text; fifth, transferring to a positive talking film the records made on said second and third films.

3. In the recording of sound film in which the spoken words seemingly emanating from the actor appearing on the film have really been spoken by another person, and which includes the steps of preparing a code text phonetically approximating a predetermined foreign text and which code text when spoken closely simulates the successive lip-movements resulting from speaking the foreign text; next having the actor repeat the code text, and simultaneously photographing the actor on a moving picture film and at the same time producing a record of the foreign text so synchronized with the action of the actor that the foreign text will appear to be spoken by the actor actually speaking only the code words.

4. In a sound motion picture apparatus wherewith to produce a sound film in which the action is portrayed by one person and the spoken words have been enunciated by another, comprising in combination a motion picture camera, a sound recording machine, a sound projecting machine with means to transfer a sound record containing the desired text within the sound projecting machine to the sound recording film of the sound recording machine, means for operating the camera, the sound recording machine and the sound projecting machine in synchronism, and means controlled by the voice of the speaker being photographed and including a microphone and mechanism operated by the microphone and connected with the same and with the sound projecting machine for actuating the sound projecting machine to transfer the sound record of the film of the sound projecting machine to the sound film of the sound recording machine, whereby a sound record of the sound projecting machine not in phonetic synchronism with the picture film is transposed to the film of the sound recording machine in phonetic synchronism with the picture film.

5. An apparatus for transferring recorded sound from one record to another in synchronism with the lip movements of a moving subject on a motion picture film which comprises the combination of a moving picture camera to take the picture of a moving subject while speaking or emitting sound, a sound recording machine, a sound projecting machine, means for operating the camera, the sound recording machine and the sound projecting machine in synchronism, the sound projecting machine being normally inactive, a microphone sensitive to the sounds emitted by the subject being photographed and means actuated by the microphone and connected with the same and with the sound projecting machine to operate the latter to record a record of the sound projecting machine not in phonetic synchronism with the picture film on the record of the sound recording machine in phonetic synchronism with the picture film.

6. In a sound motion picture apparatus, the combination of a camera to take motion pictures, a sound recording machine, a sound projecting machine, means for operating the three machines in synchronism, the sound projecting machine being normally inactive, a microphone sensitive to sounds emitted by a subject being photographed and mechanism controlled by the microphone and connected with the same and the normally inactive sound projecting machine to operate the latter intermittently to record on the film of the sound recording machine a record of the sound projecting machine corresponding phonetically to the lip movements of the subject being photographed by the said machine to produce simultaneously a motion picture of an actor and a record of sounds in phonetic synchronism with the picture film and apparently emanating from the actor but really taken from the sound record of the sound projecting machine made by the voice of a different person from the actor being photographed.

7. In a sound motion picture apparatus, a camera to take motion pictures, a sound recording machine, a sound projecting machine, means for driving the three machines in synchronism, a clutch mechanism interposed between the synchronized driving means and the sound projecting machine, a microphone actuated by the voice of the speaker being photographed and means actuated by the microphone for intermittently engaging the clutch mechanism to regulate the transfer of the sound record of the sound projecting machine to the film of the sound recording machine, whereby the sound record is transposed from the film of the sound projecting machine to the film of the sound recording machine in phonetic synchronism with the picture film.

8. An apparatus for transferring spoken words recorded on a sound film to a second sound film in phonetic synchronism with the taking of a picture film of an actor speaking approximately the same phonetics with those recorded on the first main sound record film comprising in combination a motion picture camera, a sound recording machine, a sound projecting machine arranged with a neutral sound film containing the desired text and not in phonetic synchronism with the picture film, means for transferring the record of the neutral film to the sound film of the sound recording machine, means for operating the three machines in synchronism, the sound projecting machine being normally inactive, a microphone, and associated mechanism controlled by the voice of the actor and connected with the microphone and the sound projecting machine to intermittently operate the latter to record on the film of the recording machine words and sounds of the neutral film of the sound projecting machine on the sound record of the sound recording machine in phonetic synchronism with the picture film.

GEORGE P. REGAN.
ALBERT R. DAY.